(12) United States Patent
Shahana

(10) Patent No.: US 11,584,478 B2
(45) Date of Patent: Feb. 21, 2023

(54) CONTROL DEVICE AND TRANSMISSION SYSTEM

(71) Applicant: Shimano Inc., Osaka (JP)

(72) Inventor: Satoshi Shahana, Osaka (JP)

(73) Assignee: Shimano Inc., Osaka (JP)

( * ) Notice: Subject to any disclaimer, the term of this patent is extended or adjusted under 35 U.S.C. 154(b) by 671 days.

(21) Appl. No.: 16/574,879

(22) Filed: Sep. 18, 2019

(65) Prior Publication Data

US 2020/0115006 A1 Apr. 16, 2020

(30) Foreign Application Priority Data

Oct. 12, 2018 (JP) .............................. JP2018-193497

(51) Int. Cl.
| | | |
|---|---|---|
| B62M 9/122 | (2010.01) | |
| B62J 50/20 | (2020.01) | |
| B62M 25/04 | (2006.01) | |
| B62M 9/123 | (2010.01) | |
| B62M 25/08 | (2006.01) | |
| B62M 9/132 | (2010.01) | |
| B62M 25/00 | (2006.01) | |
| B62M 6/45 | (2010.01) | |

(52) U.S. Cl.
CPC ............ *B62M 25/08* (2013.01); *B62M 9/122* (2013.01); *B60L 2200/12* (2013.01); *B62J 50/20* (2020.02); *B62M 6/45* (2013.01); *B62M 9/132* (2013.01); *B62M 25/045* (2013.01); *B62M 2025/003* (2013.01)

(58) Field of Classification Search
CPC .... B62M 25/08; B62M 25/045; B62M 9/122; B62M 6/45; B62M 2025/003; B60L 2200/12; B62J 50/20
See application file for complete search history.

(56) References Cited

U.S. PATENT DOCUMENTS

| | | | | |
|---|---|---|---|---|
| 6,725,143 | B2 * | 4/2004 | Takeda .................. | B62M 25/08 701/51 |
| 8,998,756 | B2 * | 4/2015 | Ichida ................... | B62K 23/06 474/81 |
| 10,370,061 | B2 * | 8/2019 | Wesling ................ | B62M 25/08 |
| 10,507,885 | B2 * | 12/2019 | Chen ..................... | B62M 9/133 |
| 2018/0111661 | A1 * | 4/2018 | Wesling ................ | B62M 9/123 |

FOREIGN PATENT DOCUMENTS

| | | |
|---|---|---|
| DE | 101 53 487 A1 | 5/2003 |
| JP | 10-511621 A | 11/1998 |

\* cited by examiner

*Primary Examiner* — Tinh Dang
(74) *Attorney, Agent, or Firm* — Global IP Counselors, LLP

(57) ABSTRACT

A control device includes an electronic controller configured to automatically control a transmission device of a human-powered vehicle in accordance with a shifting condition. The electronic controller is configured to set the shifting condition based on first reference information including information related to change in transmission ratio that is shifted by the transmission device.

22 Claims, 5 Drawing Sheets

CONTROL DEVICE AND TRANSMISSION SYSTEM

CROSS-REFERENCE TO RELATED APPLICATIONS

This application claims priority to Japanese Patent Application No. 2018-193497, filed on Oct. 3, 2018. The entire disclosure of Japanese Patent Application No. 2018-193497 is hereby incorporated herein by reference.

BACKGROUND

Technical Field

The present invention generally relates to a control device and a transmission system.

Background Information

A known transmission system automatically controls a transmission device of a human-powered vehicle in accordance with a shifting condition. The typical transmission system controls the transmission device in accordance with a shifting condition set based on a rotational speed of a crank of the human-powered vehicle and a threshold value to maintain the rotational speed of the crank in a predetermined range. Japanese National Phase Laid-Open Patent Publication No (Patent Document 1) discloses one example of the typical transmission system.

SUMMARY

It is preferred that a rider on a human-powered vehicle be able to travel comfortably. One object of the present disclosure is to provide a control device and a transmission system that improve the riding comfort of the human-powered vehicle.

A control device in accordance with a first aspect of the present disclosure comprises an electronic controller configured to automatically control a transmission device of a human-powered vehicle in accordance with a shifting condition. The electronic controller is configured to set the shifting condition based on first reference information including information related to a change in a transmission ratio that is shifted by the transmission device.

The control device in accordance with the first aspect can set the shifting condition based on the first reference information. Thus, the transmission device can be controlled in a preferred manner in accordance with the shifting condition. This improves the riding comfort of the human-powered vehicle.

In accordance with a second aspect of the present disclosure, the control device according to the first aspect is configured so that the human-powered vehicle includes a first sprocket driven to obtain a first transmission ratio and a second sprocket driven to obtain a second transmission ratio. The information related to the change in the transmission ratio includes information related to a combination of the first transmission ratio and the second transmission ratio.

The control device in accordance with the second aspect controls the transmission device in accordance with the shifting condition based on the combination of the first transmission ratio and the second transmission ratio. This improves the riding comfort of the human-powered vehicle.

In accordance with a third aspect of the present disclosure, the control device according to the second aspect is configured so that the first sprocket and the second sprocket are included in one of a front sprocket of the human-powered vehicle and a rear sprocket of the human-powered vehicle.

The control device in accordance with the third aspect improves the riding comfort of the human-powered vehicle.

In accordance with a fourth aspect of the present disclosure, the control device according to the second or third aspect is configured so that the information related to the change in the transmission ratio includes information related to the number of teeth of the first sprocket and the number of teeth of the second sprocket.

The control device in accordance with the fourth aspect controls the transmission device in accordance with the shifting condition based on the relationship of the number of teeth of the first sprocket and the number of teeth of the second sprocket. This improves the riding comfort of the human-powered vehicle.

In accordance with a fifth aspect of the present disclosure, the control device according to any one of the second to fourth aspects is configured so that the information related to the change in the transmission ratio includes information related to a difference in the number of teeth of the first sprocket and the number of teeth of the second sprocket.

The control device in accordance with the fifth aspect controls the transmission device in accordance with the shifting condition based on the difference in the number of teeth of the first sprocket and the number of teeth of the second sprocket. This improves the riding comfort of the human-powered vehicle.

In accordance with a sixth aspect of the present disclosure, the control device according to any one of the first to fifth aspects is configured so that the information related to the change in the transmission ratio includes information related to a combination of at least one front sprocket of the human-powered vehicle and at least one rear sprocket of the human-powered vehicle.

The control device in accordance with the sixth aspect controls the transmission device in accordance with the shifting condition based on the combination of the first front sprocket and the rear sprocket. This improves the riding comfort of the human-powered vehicle.

In accordance with a seventh aspect of the present disclosure, the control device according to the sixth aspect is configured so that the information related to the change in the transmission ratio includes at least one of information related to the transmission ratio and information related to the number of teeth of the front sprocket and the number of teeth of the rear sprocket.

The control device in accordance with the seventh aspect improves the riding comfort of the human-powered vehicle.

In accordance with an eighth aspect of the present disclosure, the control device according to any one of the first to seventh aspects is configured so that the first reference information further includes a first reference value including traveling information related to a traveling state of the human-powered vehicle.

The control device in accordance with the eighth aspect sets the shifting condition based on the information related to change in transmission ratio and the first reference information including the first reference value. Thus, the transmission device can be controlled in a preferred manner in accordance with the shifting condition. This improves the riding comfort of the human-powered vehicle.

In accordance with a ninth aspect of the present disclosure, the control device according to the eighth aspect is configured so that the shifting condition is determined based on a second reference value and a threshold value. The electronic controller is configured to set the threshold value based on the first reference information.

The control device in accordance with the ninth aspect sets the threshold value that determines the shifting condition based on the first reference information. This improves the riding comfort of the human-powered vehicle.

In accordance with a tenth aspect of the present disclosure, the control device according to the ninth aspect is configured so that the threshold value includes a first threshold value and a second threshold value. The electronic controller is configured to control the transmission device so that the transmission ratio increases in accordance with the relationship of the second reference value and the first threshold value. The electronic controller is configured to control the transmission device so that the transmission ratio decreases in accordance with the relationship of the second reference value and the second threshold value.

The control device in accordance with the tenth aspect can control the transmission device in a preferred manner in accordance with the shifting condition.

In accordance with an eleventh aspect of the present disclosure, the control device according to the tenth aspect is configured so that the first threshold value differs from the second threshold value.

The control device in accordance with the eleventh aspect reduces the shifting frequency of the transmission device. This improves the riding comfort of the human-powered vehicle.

In accordance with a twelfth aspect of the present disclosure, the control device according to the eleventh aspect is configured so that the first threshold value differs from the second threshold value by a predetermined value. The electronic controller is configured to vary the threshold value in order to change the predetermined value based on the first reference information.

The control device in accordance with the twelfth aspect varies the threshold value in order to change the predetermined value. This improves the riding comfort of the human-powered vehicle.

In accordance with a thirteenth aspect of the present disclosure, the control device according to any one of the tenth to twelfth aspects is configured so that the electronic controller is configured to set one of the first threshold value and the second threshold value in accordance with the other one of the first threshold value and the second threshold value.

The control device in accordance with the thirteenth aspect improves the riding comfort of the human-powered vehicle.

A control device in accordance with a fourteenth aspect of the present disclosure comprises an electronic controller configured to automatically control a transmission device of a human-powered vehicle in accordance with a shifting condition. The shifting condition is determined based on a second reference value and a threshold value. The electronic controller sets the threshold value based on second reference information including a present transmission ratio of the human-powered vehicle, a subsequent transmission ratio after shifting, and a first reference value including traveling information related to a traveling state of the human-powered vehicle.

The control device in accordance with the fourteenth aspect sets the threshold value that determines the shifting condition based on the second reference information. Thus, the transmission device can be controlled in a preferred manner in accordance with the shifting condition. This improves the riding comfort of the human-powered vehicle.

In accordance with a fifteenth aspect of the present disclosure, the control device according to the fourteenth aspect is configured so that the second reference information includes a reference value difference of the second reference value that is estimated from the relationship of the present transmission ratio and the first reference value and the second reference value that is estimated from the relationship of the subsequent transmission ratio and the first reference value.

The control device in accordance with the fifteenth aspect improves the riding comfort of the human-powered vehicle.

In accordance with a sixteenth aspect of the present disclosure, the control device according to the fourteenth or fifteenth aspect is configured so that the threshold value includes a first threshold value and a second threshold value. The electronic controller is configured to control the transmission device so that the present transmission ratio increases in accordance with the relationship of the second reference value and the first threshold value. The electronic controller is configured to control the present transmission device so that the transmission ratio decreases in accordance with the relationship of the second reference value and the second threshold value.

The control device in accordance with the sixteenth aspect can control the transmission device in a preferred manner in accordance with the shifting condition.

In accordance with a seventeenth aspect of the present disclosure, the control device according to the sixteenth aspect is configured so that the first threshold value differs from the second threshold value.

The control device in accordance with the seventeenth aspect reduces the shifting frequency of the transmission device. This improves the riding comfort of the human-powered vehicle.

In accordance with an eighteenth aspect of the present disclosure, the control device according to the seventeenth aspect is configured so that the first threshold value differs from the second threshold value by a predetermined value. The electronic controller is configured to vary the threshold value in order to change the predetermined value based on the second reference information.

The control device in accordance with the eighteenth aspect varies the threshold value in order to change the predetermined value. This improves the riding comfort of the human-powered vehicle.

In accordance with a nineteenth aspect of the present disclosure, the control device according to any one of the sixteenth to eighteenth aspects is configured so that the electronic controller is configured to set one of the first threshold value and the second threshold value in accordance with the other one of the first threshold value and the second threshold value.

The control device in accordance with the nineteenth aspect improves the riding comfort of the human-powered vehicle.

In accordance with a twentieth aspect of the present disclosure, the control device according to any one of the ninth to nineteenth aspects is configured so that the second reference value includes the traveling information that differs from the first reference value.

The control device in accordance with the twentieth aspect improves the riding comfort of the human-powered vehicle.

In accordance with a twenty-first aspect of the present disclosure, the control device according to any one of the eighth to twentieth aspects is configured so that the electronic controller is configured to set the shifting condition for at least one of the transmission ratio and the first reference value.

The control device in accordance with the twenty-first aspect can control the transmission device in a preferred manner in accordance with the shifting condition. This improves the riding comfort of the human-powered vehicle.

In accordance with a twenty-second aspect, the control device according to any one of the eighth to twenty-first aspects is configured so that the traveling information includes at least one of cadence, torque acting on a crank of the human-powered vehicle, vehicle speed, acceleration, and power.

The control device in accordance with the twenty-second aspect improves the riding comfort of the human-powered vehicle.

In accordance with a twenty-third aspect of the present disclosure, the control device according to any one of the first to twenty-second aspects further comprises storage that stores the shifting condition in an updatable manner.

The control device in accordance with the twenty-third aspect improves the riding comfort of the human-powered vehicle.

A transmission system in accordance with a twenty-fourth aspect of the present disclosure comprises the control device and the transmission device.

The transmission system in accordance with the twenty-fourth aspect sets the shifting condition based on various types of information. Thus, the transmission device can be controlled in a preferred manner in accordance with the shifting condition. This improves the riding comfort of the human-powered vehicle.

The control device and the transmission system in accordance with the present disclosure improve the riding comfort of the human-powered vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
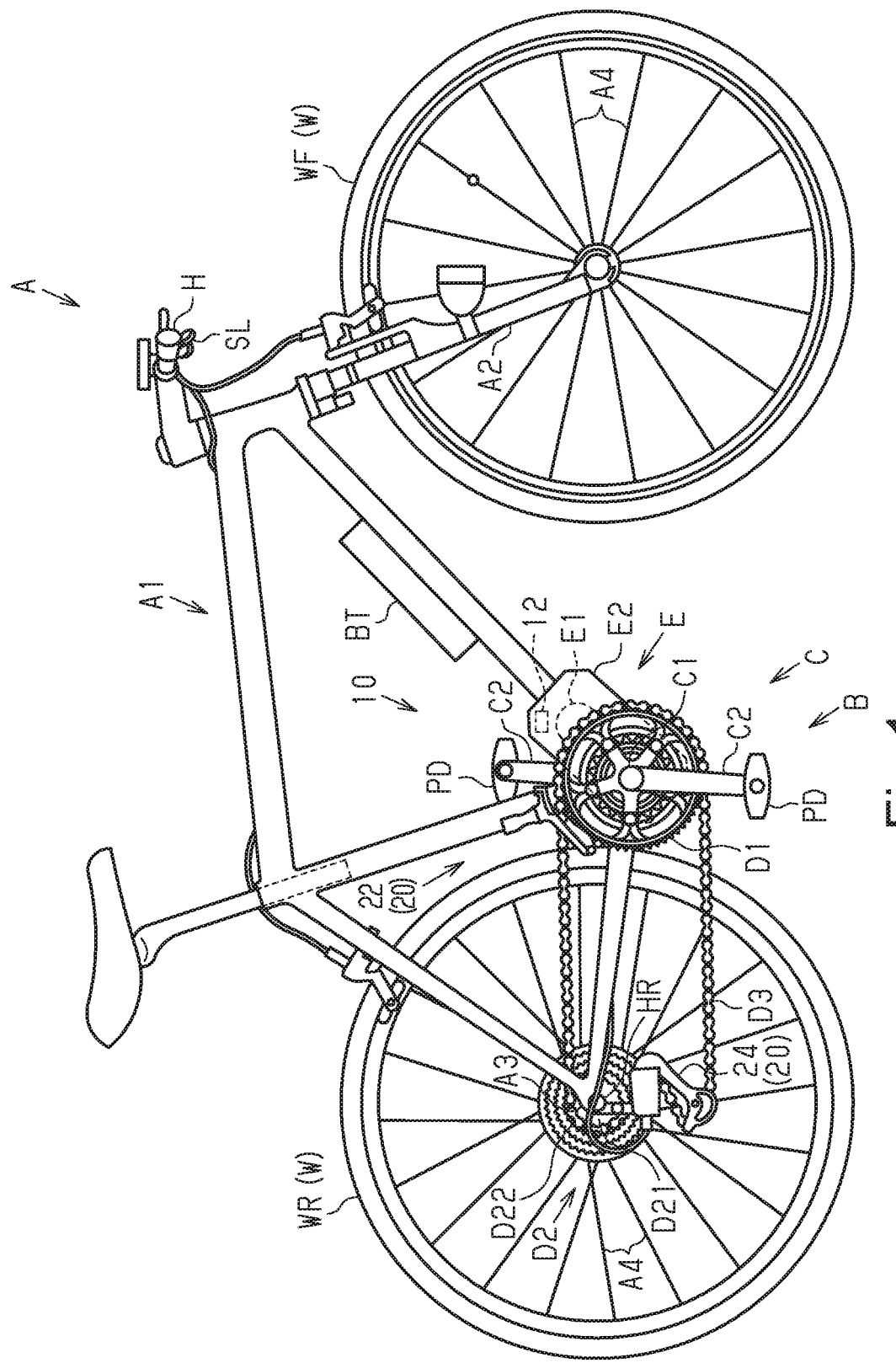
FIG. 1 is a side elevational view of a human-powered vehicle including a transmission system having a control device in accordance with a first embodiment.

A human-powered vehicle A including a transmission system 10 will now be described with reference to FIG. 1. The human-powered vehicle is a vehicle that can be driven by at least human force, which includes a vehicle that assists human force with electric driving. The human-powered vehicle does not include vehicles using only a prime mover that is not human force. In particular, the human-powered vehicle does not include vehicles that use only an internal combustion engine as the prime mover. The human-powered vehicle is a compact light vehicle that does not require a license for driving on a public road. The illustrated human-powered vehicle A is a bicycle including an electric assist unit E that assists the propulsion of the human-powered vehicle A by using electric energy. Specifically, the illustrated human-powered vehicle A is a trekking bike. The human-powered vehicle A further includes a frame A1, a front fork A2, a wheel W, a handlebar H, and a drive train B. The wheel W includes a front wheel WF and a rear wheel WR.

The drive train B is, for example, of a chain drive type. The drive train B includes a crank C, a front sprocket D1, a rear sprocket D2, and a chain D3. The crank C includes a crankshaft C1 and two crank arms C2. The crankshaft C1 is rotatably supported by the frame A1. The two crank arms C2 are provided on two ends of the crankshaft C1, respectively. A pedal PD is rotatably coupled to a distal end of each crank arm C2. The drive train B can be of any type such as a belt drive type or a shaft drive type.

The front sprocket D1 is provided on the crank C so as to rotate integrally with the crankshaft C1. The rear sprocket D2 is provided on a hub HR of the rear wheel WR. The chain D3 is wound around the front sprocket D1 and the rear sprocket D2. The human driving force applied to the pedals PD by a rider riding the human-powered vehicle A is transmitted via the front sprocket D1, the chain D3, and the rear sprocket D2 to the rear wheel WR The electric assist unit E is actuated to assist propulsion of the human-powered vehicle A. For example, the electric assist unit E is actuated in accordance with the human driving force applied to the pedals PD. The electric assist unit E includes an electric motor E1. The electric assist unit E is actuated with electric power supplied from a battery BT mounted on the human-powered vehicle A.

The transmission system 10 includes a control device 12 and a transmission device 20. The control device 12 is, for example, accommodated in a housing E2 of the electric assist unit E. The control device 12 is actuated by electric power supplied from the battery BT.

The transmission device 20 is configured to be driven mechanically or electrically, for example, in accordance with operation of a shift lever SL. In a case where the transmission device 20 is actuated electrically, the transmission device 20 is actuated by electric power supplied from the battery BT, or electric power supplied from a dedicated power source mounted on the transmission device 20. The transmission device 20 includes an external shifting device. In one example, the transmission device 20 includes at least one of a front derailleur 22 and a rear derailleur 24. The front derailleur 22 is provided in the vicinity of the front sprocket D1. The front derailleur 22 is driven to change the front sprocket D1, around which the chain D3 is wound, thereby changing a transmission ratio GR of the human-powered vehicle A. The transmission ratio GR of the human-powered vehicle A is determined based on the relationship of the number of teeth TF of the front sprocket D1 and the number of teeth TR of the rear sprocket D2. In one example, the transmission ratio of the human-powered vehicle A is determined by the ratio of the rotational speed of the rear sprocket D2 to the rotational speed of the front sprocket D1. That is, the transmission ratio GR of the human-powered vehicle A is determined by the ratio of the number of teeth TR of the rear sprocket to the number of teeth TF of the front sprocket D1. The rear derailleur 24 is provided at a rear end A3 of the frame A1. The rear derailleur 24 is driven to change the rear sprocket D2, around which the chain D3 is wound, thereby changing the transmission ratio GR of the human-powered vehicle A. The transmission device 20 can include an internal shifting device instead of the external shifting device. In this case, the internal shifting device is provided, for example, on the hub HR of the rear wheel WR. The transmission device 20 can include a continuously variable transmission instead of the external shifting device. In this case, the continuously variable transmission is provided, for example, on the hub HR of the rear wheel WR.

The human-powered vehicle A includes a first sprocket D21 that is driven to obtain a first transmission ratio GR1 and a second sprocket that is driven to obtain a second transmission ratio GR2. The first sprocket D21 and the second sprocket D22 are included in one of the front sprockets D1 of the human-powered vehicle A and the rear sprockets D2 of the human-powered vehicle A. In the present embodiment, the first sprocket D21 and the second sprocket D22 are included in the rear sprockets D2 of the human-powered vehicle. The first sprocket D21 is, for example, the rear sprocket D2, around which the chain D3 is wound, prior to shifting by the rear derailleur 24. The first transmission ratio GR1 is obtained by shifting the chain D3, which is wound around a predetermined front sprocket D1, to the first sprocket D21. The second sprocket D22 is, for example, the rear sprocket D2, around which the chain D3 is wound, subsequent to shifting by the rear derailleur 24. The second transmission ratio GR2 is obtained by shifting the chain D3, which is wound around a predetermined front sprocket D1, to the second sprocket D22.

The specific configuration of the control device 12 will now be described with reference to FIG. 2. The control device 12 includes an electronic controller 14 that is configured to automatically control the transmission device 20 of the human-powered vehicle A in accordance with a shifting condition. The electronic controller 14 is formed of one or more semiconductor chips that are mounted on a circuit board. The term "electronic controller" as used herein refers to hardware that executes a software program, and does not include a human. For simplicity, the electronic controller 14 will be hereinafter referred to as the controller 14. The controller 14 is a central processing unit (CPU) or a micro-processing unit (MPU) that includes at least one processor 14a. The controller 14, for example, can control the transmission device 20 in accordance with an operation of the shift lever SL. The controller 14 can control various types of components mounted on the human-powered vehicle A in addition to the transmission device 20 of the human-powered vehicle A. The control device 12 further includes storage 16 that stores the shifting condition in an updatable manner. The storage 16 is any computer storage device or any non-transitory computer-readable medium with the sole exception of a transitory, propagating signal. For example, the storage 16 includes a non-volatile memory and a volatile memory. The storage 16 stores, for example, various types of control programs and preset information. The controller 14 may be one or more integrated circuits having firmware for causing the circuitry to complete the activities described herein. Of course, any number of other analog and/or digital components capable of performing the below described functionality can be provided in place of, or in conjunction with the described controller elements.

The controller 14, for example, sets the shifting condition based on various types of information including a first reference value RV1. The first reference value RV1 includes traveling information related to a traveling state of the human-powered vehicle A. The traveling information includes at least one of cadence, torque acting on the crank C of the human-powered vehicle A, vehicle speed, acceleration, and power. The cadence corresponds to the rotational speed of the crank C. The power is the product of cadence and torque. In the present embodiment, the first reference value RV1 includes the actual vehicle speed and an estimated vehicle speed VE of the human-powered vehicle A. The estimated vehicle speed VE is the vehicle speed estimated based on, for example, at least one of the transmission ratio GR of the human-powered vehicle A, cadence, and, a circumferential length LC of the wheel W. In a case where information related to the shifting condition is already stored in the storage 16, the controller 14 can update the information related to shifting condition stored in the storage 16 with information related to a newly set shifting condition.

Figure 3:
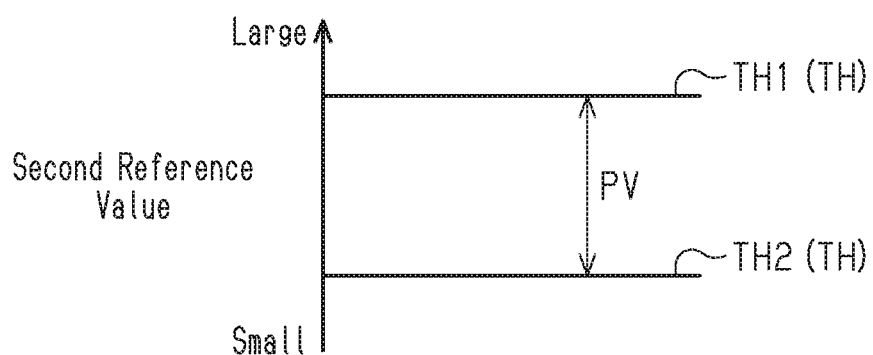
FIG. 3 is a map illustrating one example of a shifting condition used for control of a transmission device.

As illustrated in FIG. 3, the shifting condition is set based on a second reference value RV2 and a threshold value TH. The second reference value RV2 includes the traveling information related to the traveling state of the human-powered vehicle A. In one example, the second reference value RV2 includes traveling information that differs from the first reference value RV1. The second reference value RV2 can include the same traveling information as the first reference value RV1. In the present embodiment, the second reference value RV2 includes estimated cadence CE. The estimated cadence CE is the cadence estimated, for example, based on the relationship of the vehicle speed of the human-powered vehicle A and the transmission ratio GR of the human-powered vehicle A. In a case where the estimated cadence CE is included in the second reference value RV2, the transmission device 20 can be controlled in a preferred manner in accordance with the shifting condition even if there is a deviation between the vehicle speed of the human-powered vehicle A and the actual cadence. In one example, the estimated cadence CE is calculated based on following equation (1).

Equation 1

$$CE = RW/GR \tag{1}$$

The present rotational speed RW of the wheel W is substituted into variable RW. The rotational speed RW of the wheel W is the rotational speed RW of the front wheel WF or the rotational speed RW of the rear wheel WR. The rotational speed RW of the wheel W is correlated with the vehicle speed of the human-powered vehicle A. The rotational speed RW of the wheel W can be detected by a magnetic sensor or the like or be calculated from the vehicle speed of the human-powered vehicle A and the circumferential length LC of the wheel W. The present transmission ratio GR of the human-powered vehicle A is substituted into variable GR. In one example, the controller 14 calculates the estimated cadence CE based on equation (1).

The threshold value TH includes a first threshold value TH1 and a second threshold value TH2. The controller 14 controls the transmission device 20 so that the present transmission ratio GR increases in accordance with the relationship of the second reference value RV2 and the first threshold value TH1. Further, the controller 14 controls the transmission device 20 so that the present transmission ratio GR decreases in accordance with the relationship of the second reference value RV2 and the second threshold value TH2. The first threshold value TH1 differs from the second threshold value TH2. That is, the threshold values TH1 and TH2 that determine the shifting condition have a predetermined range. In one example, the first threshold value TH1 has a difference of a predetermined value PV from the second threshold value TH2. The predetermined value PV is a predetermined width that sets the predetermined range. In the present embodiment, the first threshold value TH1 is greater than the second threshold value TH2. In one example, the controller 14 controls the transmission device 20 so that the present transmission ratio GR increases in a case where the second reference value RV2 becomes greater than the first threshold value TH1. Further, the controller 14 controls the transmission device 20 so that the present transmission ratio GR decrease upon determining the second reference value RV2 becomes less than the second threshold value TH2.

The controller 14 sets the shifting condition in accordance with at least one of a first example and a second example, which will now be described. In the first example, the controller 14 sets the shifting condition based on first reference information IR1 including information related to a change in the transmission ratio GR that is shifted by the transmission device 20. The information related to a change in the transmission ratio GR includes at least one of first information and second information. The first information includes information related to the combination of the first transmission ratio GR1 and the second transmission ratio GR2. In one example, the first information includes information related to the number of teeth of the first sprocket D21 and the number of teeth of the second sprocket D22. Specifically, the first information includes information related to the difference in the number of teeth of the first sprocket D21 and the number of teeth of the second sprocket D22. In other words, the first information includes information related to the difference in the number of teeth of the rear sprocket D2, around which the chain D3 is wound prior to shifting by the transmission device 20, and the rear sprocket D2, around which the chain D3 is wound subsequent to shifting by the transmission device 20.

The second information includes information related to the combination of at least one front sprocket D1 of the human-powered vehicle A and at least one rear sprocket D2 of the human-powered vehicle A. In one example, the second information includes at least one of information related to the transmission ratio GR of the human-powered vehicle A and information related to the number of teeth TF of the front sprocket D1 and the number of teeth TR of the rear sprocket D2. The information related to the transmission ratio GR of the human-powered vehicle A includes, for example, information related to the present transmission ratio GR and information related to the subsequent transmission ratio GR after shifting. The information related to the numbers of teeth TF and TR of the sprockets D1 and D2 includes, for example, information related to the numbers of teeth TF and TR of the sprockets D1 and D2, around which the chain D3 is wound prior to shifting by the transmission device 20, and information related to the numbers of teeth TF and TR of the sprockets D1 and D2, around which the chain D3 is wound subsequent to shifting by the transmission device 20. The first reference information IR1 further includes the first reference value RV1 including the traveling information related to the traveling state of the human-powered vehicle A. In this case, the information related to a change in the transmission ratio GR and the first reference value RV1 are included in the first reference information IR1.

The controller 14 sets the threshold value TH based on the first reference information IR1. In one example, the controller 14 sets at least one of the threshold value TH1 and the second threshold value TH2 based on the first reference information IR1. The controller 14 varies the threshold value TH based on the first reference information IR1 in order to change the predetermined value PV. In one example, the controller 14 varies the threshold value TH in accordance with the first reference information IR1 in order to change the predetermined value PV for at least one of the transmission ratio GR of the human-powered vehicle A, the first reference value RV1, and the second reference value RV2. The controller 14 varies the threshold value TH based on the first reference information IR1 to increase the predetermined value PV or to decrease the predetermined value PV.

The controller 14 is configured to set one of the first threshold value TH1 and the second threshold value TH2 in accordance with the other one of the first threshold value TH1 and the second threshold value TH2. In one example, the controller 14 sets one of the threshold values TH1 and TH2 based on a reference cadence CS and sets the other one of the threshold values TH1 and TH2 in accordance with the one of the threshold values TH1 and TH2. The reference cadence CS can be set, for example, based on the typical cadence of a rider riding the human-powered vehicle A or based on the actual cadence of the rider riding the human-powered vehicle A. The controller 14 sets the shifting condition for at least one of the transmission ratio GR of the human-powered vehicle A and the first reference value RV1. The controller 14 can set the shifting condition for at least one of the transmission ratio GR of the human-powered vehicle A, the first reference value RV1, and the second reference value RV2.

In the second example, the controller 14 sets the threshold value TH based on second reference information IR2 that includes the present transmission ratio GR of the human-powered vehicle A, the subsequent transmission ratio GR after shifting, and the first reference value RV1 including the traveling information related to the traveling state of the human-powered vehicle A. In one example, the controller 14 sets at least one of the first threshold value TH1 and the second threshold value TH2 based on the second reference information IR2. The controller 14 varies the threshold value TH based on the second reference information IR2 in order to change the predetermined value PV. In one example, the controller 14 varies the threshold value TH based on the second reference information IR2 in order to change the predetermined value PV for at least one of the transmission ratio GR of the human-powered vehicle A, the first reference value RV1, and the second reference value RV2. The controller 14 varies the threshold value TH based on the second reference information IR2 to increase the predetermined value PV or decrease the predetermined value PV. The second reference information IR2 includes a reference value difference of the second reference value RV2, which is estimated in accordance with the relationship of the present transmission ratio GR and the first reference value RV1, and the second reference value RV2, which is estimated in accordance with the relationship of the subsequent transmission ratio GR after shifting and the first reference value RV1.

The controller 14 sets one of the first threshold value TH1 and the second threshold value TH2 in accordance with the other one of the first threshold value TH1 and the second threshold value TH2. In one example, the controller 14 sets one of the threshold values TH1 and TH2 based on the reference cadence CS. Further, the controller 14 sets the other one of the threshold values TH1 and TH2 in accordance with the one of the threshold values TH1 and TH2 set based on the reference cadence CS. The controller 14 sets the shifting condition for at least one of the transmission ratio GR of the human-powered vehicle A and the first reference value RV1. The controller 14 can set the shifting condition for at least one of the transmission ratio GR of the human-powered vehicle A, the first reference value RV1, and the second reference value RV2.

The controller 14, for example, sets the shifting condition in accordance with at least one of a first setting process and a second setting process, which will now be described. The first setting process is a process corresponding to the first example and the second example. The first setting process, for example, includes first to sixth steps. In the first step, the controller 14 sets the reference cadence CS. In the second step, the controller 14 sets any first threshold value TH1 based on the reference cadence CS. In the third step, the controller 14 calculates the estimated vehicle speed VE based on the cadence corresponding to the first threshold value TH1 or the like. In one example, the estimated vehicle speed VE is calculated based on equation (2). The estimated vehicle speed VE can be the actual vehicle speed in a case where the cadence of the human-powered vehicle A becomes equal to the cadence corresponding to the first threshold value TH1.

Equation 2

$$VE = (CS+U) \cdot (TF/TR_n) \cdot LC \cdot 60/1000 \qquad (2)$$

The reference cadence CS is substituted into variable CS. The absolute value of the difference of the reference cadence CS and the cadence corresponding to the first threshold value TH1 is substituted into variable U. That is, CS+U represents the cadence corresponding to the first threshold value TH1. The variable U is selected, for example, in a range of 5 rpm to 10 rpm. The number of teeth TF of the front sprocket D1, around which the chain D3 is wound, is substituted into variable TF. The number of teeth TR of the rear sprocket D2, around which the chain D3 is wound, is substituted into variable $TR_n$. That is, $TF/TR_n$ represents the present transmission ratio GR of the human-powered vehicle A. The circumferential length LC of the wheel W is substituted into constant LC. The unit for the circumferential length LC of the wheel W can be, for example, expressed as "m". In one example, the controller 14 calculates the estimated vehicle speed VE based on equation (2). That is, the controller 14 calculates the estimated vehicle speed VE that corresponds to the cadence corresponding to the first threshold value TH1. The unit for the estimated vehicle speed VE can be, for example, expressed as km/h.

In the fourth step, the controller 14 calculates cadence CA subsequent to shifting by the transmission device 20. The cadence CA subsequent to shifting is the cadence after the transmission device 20 is controlled in accordance with the relationship of the second reference value RV2 and the first threshold value TH1. The cadence CA subsequent to shifting can, for example, be calculated based on equation (3).

[Equation 3]

$$CA = VE/(TF/TR_{n+1})/LC/60 \cdot 1000 \qquad (3)$$

The estimated vehicle speed VE calculated from equation (2) is substituted into variable VE. The number of teeth TF of the front sprocket D1, around which the chain D3 is wound, is substituted into the variable TF after the transmission device 20 is shifted to increase the transmission ratio GR of the human-powered vehicle A. In the example shown by equation (3), the variable TF is same as the number of teeth TF of the front sprocket D1 that is substituted into equation (2). The number of teeth TR of the rear sprocket D2, around which the chain D3 is wound, is substituted into variable $TR_{n+1}$ after the transmission device 20 is shifted to increase the transmission ratio GR of the human-powered vehicle A. That is, $TF/TR_{n+1}$ represents the transmission ratio GR of the human-powered vehicle A subsequent to shifting. The circumferential length LC of the wheel W is substituted into the constant LC. In one example, the controller 14 calculates the cadence CA subsequent to shifting based on equation (3).

In the fifth step, the controller 14 calculates the second threshold value TH2 based on the cadence CA subsequent to shifting. In one example, the controller 14 calculates the second threshold value TH2 that satisfies following determination equation (4).

Equation 4

$$CA > CS-D \qquad (4)$$

The cadence CA subsequent to shifting calculated in equation (3) is substituted into variable CA. The reference cadence CS is substituted into the variable CS. Variable D is the absolute value of the difference of the reference cadence CS and the cadence corresponding to the second threshold value TH2. That is, CS–D represents the cadence corresponding to the second threshold value TH2. In one example, the controller 14 calculates the second threshold value TH2 (CS–D) that satisfies the determination equation (4).

In the sixth step, the controller 14 sets the shifting condition corresponding to at least one of the present transmission ratio GR of the human-powered vehicle A and the first reference value RV1, as well as the shifting condition corresponding to at least one of the subsequent transmission ratio GR after shifting and the first reference value RV1. Specifically, the controller 14 sets the first threshold value TH1, which is set in the second step, as the shifting condition corresponding to at least one of the present transmission ratio GR of the human-powered vehicle A and the first reference value RV1. Further, the controller 14 sets the second threshold value TH2 calculated in the determination equation (4) as the shifting condition corresponding to at least one of the subsequent transmission ratio GR subsequent to shifting and the first reference value RV1. In this manner, the controller 14 sets the shifting condition in accordance with the first setting process.

The corresponding relationship of the first setting process and the first example will now be described. The variable $TR_n$ in equation (2) and the variable $TR_{n+1}$ in equation (3) are included in the information related to the number of teeth of the first sprocket D21 and the number of teeth of the second sprocket D22. Further, $TF/TR_n$ in equation (2) and $TF/TR_{n+1}$ of equation (3) are included in the information related to the combination of at least one front sprocket D1 of the human-powered vehicle A and at least one rear sprocket D2 of the human-powered vehicle A. In equation (2), TF/TR$_n$ corresponds to the first transmission ratio GR1. In equation (3), TF/TR$_{n+1}$ corresponds to the second transmission ratio GR2.

The corresponding relationship of the first setting process and the second example will now be described. The sum of the variable CS and the variable U in equation (2) is included in the second reference value RV2 that is estimated in accordance with the relationship of the present transmission ratio GR and the first reference value RV1. In one example, the sum of the variable CS and the variable U corresponds to the second reference value RV2 that is estimated in accordance with the relationship of the present transmission ratio GR and the first reference value RV1. Further, in another example, equation (2) is modified into an equation for calculation of CS+U. In this case, the controller 14 substitutes the variable VE in equation (2) with a vehicle speed and calculates the value corresponding to CS+U. The vehicle speed can be a typical vehicle speed in a case where a rider riding the human-powered vehicle A drives the human-powered vehicle A. Alternatively, the vehicle speed can be the actual vehicle speed of the human-powered vehicle A. The cadence CA subsequent to shifting in equation (3) is included in the second reference value RV2 that is estimated in accordance with the relationship of the subsequent transmission ratio GR after shifting and the first reference value RV1. In the first setting process that corresponds to the second example, the controller 14 can calculate the second threshold value TH2 from the relationship of any first threshold value TH1 and the reference value difference instead of the determination equation (4).

The second setting process is a process corresponding to the first example and the second example. The second setting process includes seventh to twelfth steps. In the seventh step, the controller 14 sets the reference cadence CS. In the eighth step, the controller 14 sets any second threshold value TH2 based on the reference cadence CS. In the ninth step, the controller 14 calculates the estimated vehicle speed VE based on the cadence corresponding to the second threshold value TH2 or the like. In one example, the estimated vehicle speed VE is calculated based on equation (5).

Equation 5

$$VE = (CS - D) \cdot (TF/TR_n) \cdot LC \cdot 60/1000 \qquad (5)$$

The reference cadence CS is substituted into the variable CS. The absolute value of the difference of the reference cadence CS and the cadence corresponding to the second threshold value TH2 is substituted into the variable D. That is, CS−D represents the cadence corresponding to the second threshold value TH2. The variable D is selected, for example, in a range of 5 rpm to 10 rpm. The number of teeth TF of the front sprocket D1, around which the chain D3 is wound, is substituted into the variable TF. The number of teeth TR of the rear sprocket D2, around which the chain D3 is wound, is substituted into the variable TR$_n$. That is, TF/TR$_n$ represents the present transmission ratio GR of the human-powered vehicle A. The circumferential length LC of the wheel W is substituted into the constant LC. The unit for the circumferential length LC of the wheel W can, for example, be expressed as "m". In one example, the controller 14 calculates the estimated vehicle speed VE based on equation (5). That is, the controller 14 calculates the estimated vehicle speed VE that corresponds to the cadence corresponding to the second threshold value TH2. The unit for the estimated vehicle speed VE can be, for example, expressed as km/h.

In the tenth step, the controller 14 calculates cadence CB subsequent to shifting resulting from shifting by the transmission device 20. The cadence CB subsequent to shifting is the cadence after the transmission device 20 is controlled in accordance with the relationship of the second reference value RV2 and the second threshold value TH2. The cadence CB subsequent to shifting is calculated, for example, based on equation (6).

Equation 6

$$CB = VE/(TF/TR_{n-1})/LC/60 \cdot 1000 \qquad (6)$$

The estimated vehicle speed VE calculated from equation (5) is substituted into the variable VE. The number of teeth TF of the front sprocket D1, around which the chain D3 is wound, is substituted into the variable TF after the transmission device 20 is shifted to decrease the transmission ratio GR of the human-powered vehicle A. In the example shown by equation (6), the variable TF is the same as the number of teeth TF of the front sprocket D1 that is substituted into equation (5). The number of teeth TR of the rear sprocket D2, around which the chain D3 is wound, is substituted into variable TR$_{n-1}$ after the transmission device 20 is shifted to decrease the transmission ratio GR of the human-powered vehicle A. That is, TF/TR$_{n-1}$ represents the transmission ratio GR of the human-powered vehicle A subsequent to shifting. The circumferential length LC of the wheel W is substituted into the constant LC. In one example, the controller 14 calculates the cadence CB subsequent to shifting based on equation (6).

In the eleventh step, the controller 14 calculates the first threshold value TH1 based on the CB subsequent to shifting. In one example, the controller 14 calculates the first threshold value TH1 that satisfies following determination equation (7).

Equation 7

$$CB > CS + U \qquad (7)$$

The cadence CB subsequent to shifting calculated with equation (6) is substituted into the variable CB. The reference cadence CS is substituted into the variable CS. The variable U is the absolute value of the difference of the cadence corresponding to the reference cadence CS and the first threshold value TH1. That is, CS+U represents the cadence corresponding to the first threshold value TH1. In one example, the controller 14 calculates the first threshold value TH1 (CS+U) that satisfies the determination equation (7).

In the twelfth step, the controller 14 sets the shifting condition corresponding to at least one of the present transmission ratio GR of the human-powered vehicle A and the first reference value RV1, as well as the shifting condition corresponding to at least one of the subsequent transmission ratio GR after shifting and the first reference value RV1. Specifically, the controller 14 sets the second threshold value TH2, which is set in the second step, as the shifting condition corresponding to at least one of the present transmission ratio GR of the human-powered vehicle A and the first reference value RV1. Further, the controller 14 sets the first threshold value TH1 calculated in the determination equation (7) as the shifting condition corresponding to at least one of the subsequent transmission ratio GR after shifting and the first reference value RV1. In this manner, the controller 14 sets the shifting condition in accordance with the second setting process. The controller 14 sets the shifting condition in accordance with at least one of the first setting process and the second setting process for at least one of the transmission ratio GR of the human-powered vehicle A and the first reference value RV1.

The corresponding relationship of the second setting process and the first example will now be described. The variable $TR_n$ in equation (5) and the variable $TR_{n-1}$ in equation (6) are included in the information related to the number of teeth of the first sprocket D21 and the number of teeth of the second sprocket D22. $TF/TR_n$ in equation (5) and $TF/TR_{n-1}$ of equation (6) are included in the information related to the combination of at least one front sprocket D1 of the human-powered vehicle A and at least one rear sprocket D2 of the human-powered vehicle A. In equation (5), $TF/TR_n$ corresponds to the first transmission ratio GR1. In equation (6), $TF/TR_{n-1}$ corresponds to the second transmission ratio GR2.

The corresponding relationship of the second setting process and the second example will now be described. The difference of the variable CS and the variable D in equation (5) is included in the second reference value RV2 that is estimated in accordance with the relationship of the present transmission ratio GR and the first reference value RV1. In one example, the difference of the variable CS and the variable D corresponds to the second reference value RV2 that is estimated in accordance with the relationship of the present transmission ratio GR and the first reference value RV1. Further, in another example, equation (5) is modified into an equation for calculation of CS–D. In this case, the controller 14 substitutes the variable VE in equation (5) with a vehicle speed and calculates the value corresponding to CS–CD. The cadence CB subsequent to shifting in equation (6) is included in the second reference value RV2 that is estimated in accordance with the relationship of the subsequent transmission ratio GR after shifting and the first reference value RV1. In the second setting process that corresponds to the second example, the controller 14 can calculate the first threshold value TH1 in accordance with the relationship of any second threshold value TH2 and the reference value difference instead of the determination equation (7).

The controller 14 automatically controls the transmission device 20 of the human-powered vehicle A in accordance with the shifting condition set according to at least one of the first setting process and the second setting process. Specifically, the controller 14 reads the shifting condition corresponding to at least one of the present transmission ratio GR of the human-powered vehicle A, the present first reference value RV1 (actual vehicle speed), and the present second reference value RV2 from the storage 16. Then, the controller 14 automatically controls the transmission device 20 in accordance with the shifting condition. This improves the riding comfort of the human-powered vehicle A.

Figure 2:
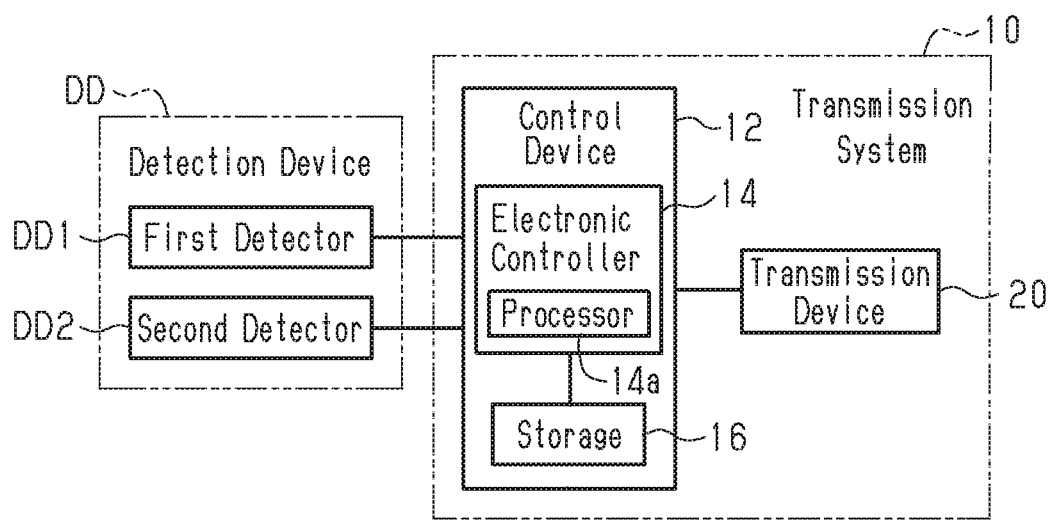
FIG. 2 is a block diagram of a transmission system showing electrical connections relationship of the control device shown in FIG. 1 and various components.

As shown in FIG. 2, the human-powered vehicle A further includes a detection device DD that detects various types of information. The detection device DD includes a first detector DD1 and a second detector DD2. The first detector DD1 is configured to detect the rotational speed RW of the wheel W. The first detector DD1 is, for example, a magnetic sensor that detects a magnet provided on a spoke A4 of the wheel W. In one example, the first detector DD1 is provided on the frame A1 or the front fork A2. The first detector DD1 outputs the detected information related to the rotational speed RW of the wheel W to the controller 14. The vehicle speed of the human-powered vehicle A is the product of the rotational speed of the wheel W and the circumferential length LC of the wheel W. The second detector DD2 is configured to detect the present transmission ratio GR of the human-powered vehicle A. The second detector DD2 includes various types of sensors configured to detect the present transmission ratio GR of the human-powered vehicle A. In one example, the second detector DD2 is provided on the transmission device 20. The second detector DD2 outputs the detected information related to the present transmission ratio GR of the human-powered vehicle A to the controller 14.

Figure 4:
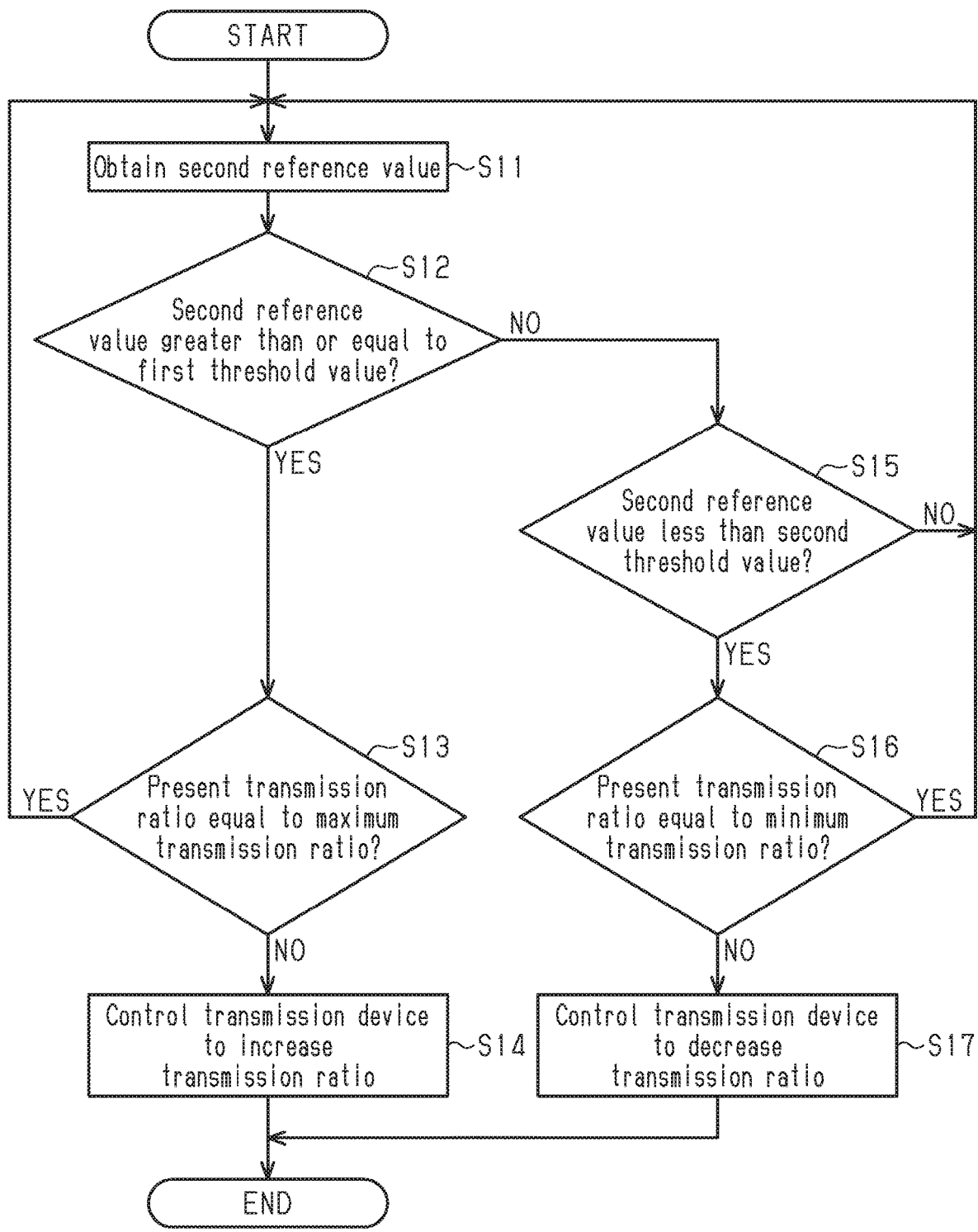
FIG. 4 is a flowchart illustrating one example of an automatic shifting control executed by the control device shown in FIG. 1.

With reference to FIG. 4, one example of an automatic shifting control executed by the control device 12 will now be described. The controller 14 executes the automatic shifting control to automatically control the transmission device 20 of the human-powered vehicle A, for example, in accordance with the shifting condition. In step S11, the controller 14 obtains the second reference value RV2. In one example, the controller 14 obtains the second reference value RV2 based on various types of information obtained from the detection device DD and equation (1). In step S12, the controller 14 determines whether the second reference value RV2 is greater than or equal to the first threshold value TH1. Upon determining that the second reference value RV2 is greater than or equal to the first threshold value TH1 in step S12, the controller 14 proceeds to step S13.

In step S13, the controller 14 determines whether the present transmission ratio GR of the human-powered vehicle A is the maximum transmission ratio. The maximum transmission ratio of the human-powered vehicle A is the maximum transmission ratio GR based on the relationship of the front sprocket D1 and the rear sprocket D2. Upon determining that the present transmission ratio GR of the human-powered vehicle A is the maximum transmission ratio in step S13, the controller 14 returns to step S11. Upon determining that the present transmission ratio GR of the human-powered vehicle A is not the maximum transmission ratio, the controller 14 proceeds to step S14. In step S14, the controller 14 controls the transmission device 20 to increase the transmission ratio GR of the human-powered vehicle A.

Upon determining the second reference value RV2 is less than the first threshold value TH1 in step S12, the controller 14 proceeds to step S15. In step S15, the controller 14 determines whether the second reference value RV2 is less than the second threshold value TH2. Upon determining that the second reference value RV2 is greater than or equal to the second threshold value TH2 in step S15, the controller 14 returns to step S11. Upon determining that the second reference value RV2 is less than the second threshold value TH2, the controller 14 proceeds to step S16.

In step S16, the controller 14 determines whether the present transmission ratio GR of the human-powered vehicle A is the minimum transmission ratio. The minimum transmission ratio of the human-powered vehicle A is the minimum transmission ratio GR based on the relationship of the front sprocket D1 and the rear sprocket D2. Upon determining that the present transmission ratio GR of the human-powered vehicle A is the minimum transmission ratio in step S16, the controller 14 returns to step S11. Upon determining that the present transmission ratio GR of the human-powered vehicle A is not the minimum transmission ratio in step S16, the controller 14 proceeds to step S17. In step S17, the controller 14 controls the transmission device 20 to decrease the transmission ratio GR of the human-powered vehicle A. This completes the processes of steps S11 to S17. The controller 14 repeats the automatic shifting control including steps S11 to S17, for example, as the human-powered vehicle A travels.

Figure 5:
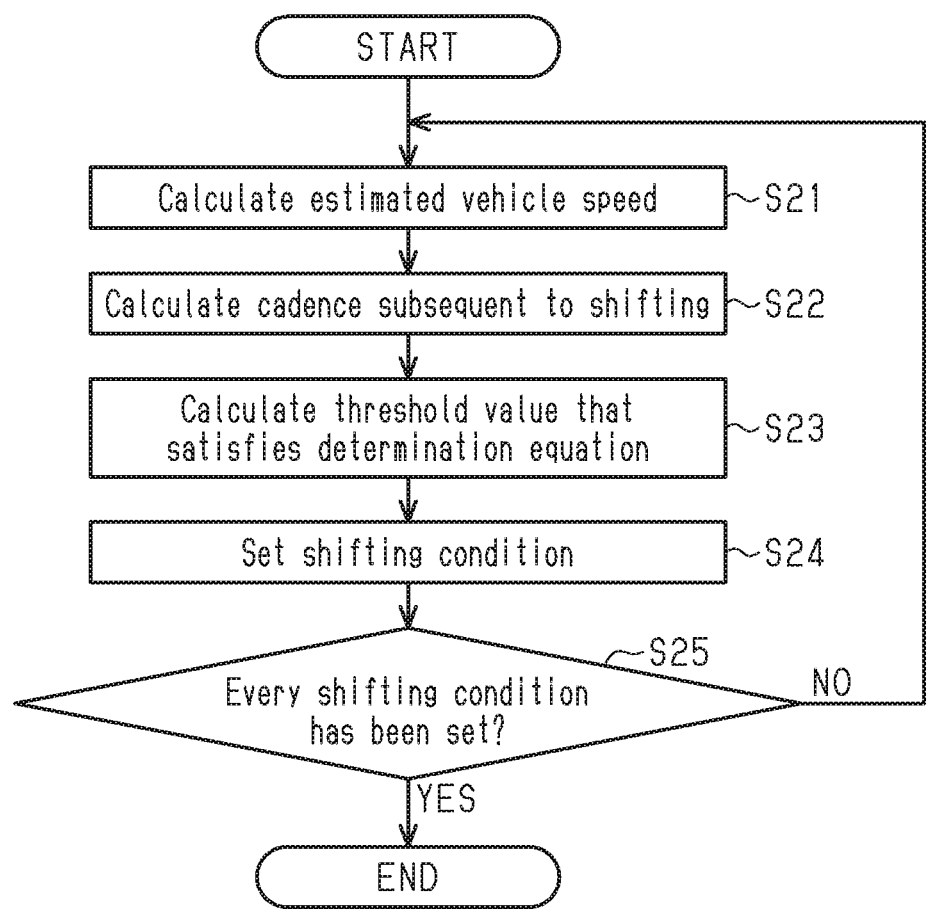
FIG. 5 is a flowchart illustrating one example of a first condition setting control executed by the control device shown in FIG. 1.

With reference to FIG. 5, one example of a first condition setting control executed by the control device 12 will now be described. The controller 14 executes the first condition setting control to set a new shifting condition, for example, in accordance with at least one of the first example and the second example.

In step S21, the controller 14 calculates the estimated vehicle speed VE. In one example, the controller 14 calculates the estimated vehicle speed VE based on equation (2) or equation (5). In step S22, the controller 14 calculates the cadence CA and CB subsequent to shifting. In one example, the controller 14 calculates the cadence CA and CB subsequent to shifting based on equation (3) or equation (6). In step S23, the controller 14 calculates the threshold value TH that satisfies the determination equation. In one example, the controller 14 calculates the second threshold value TH2 that satisfies the determination equation (4) or the first threshold value TH1 that satisfies the determination equation (7). In step S24, the controller 14 sets the shifting condition. Specifically, the controller 14 sets the threshold values TH1 and TH2, which are set in step S21, and the threshold values TH1 and TH2, which are calculated in step S23, as the shifting condition.

In step S25, the controller 14 determines whether every shifting condition has been set. In one example, the controller 14 determines whether the shifting condition has been set for at least one of the transmission ratio GR of the human-powered vehicle A and the first reference value RV1. Upon determining that every shifting condition has not been set, the controller 14 returns to step S21. Upon determining that every shifting condition has been set in step S25, the controller 14 ends the processes of steps S21 to S25. The controller 14 can execute the first condition setting control including steps S21 to S25 in a stage of initial setting for various types of components installed in the human-powered vehicle A, or can be executed as the human-powered vehicle A travels. In a case where the first condition setting control is executed as the human-powered vehicle A travels, in step S21, the estimated vehicle speed VE can be set to the actual vehicle speed in a case where the cadence of the human-powered vehicle A becomes the cadence corresponding to the first threshold value TH1.

In an example in which the estimated cadence CE is included in the second reference value RV2 that determines the shifting condition, the estimated cadence CE will greatly change in a case where shifting is performed by the transmission device 20. This is because the estimated cadence CE depends on the vehicle speed. Accordingly, in a case where the shifting condition stored in advance in the storage 16 is used during an automatic shifting control, the determination equation (4) or the determination equation (7) will not be satisfied. Consequently, the transmission device 20 will not be controlled stably. In contrast, the transmission system 10 sets the shifting condition in accordance with various types of information. Thus, the transmission device 20 can be controlled in a preferred manner in accordance with the shifting condition. This improves the riding comfort of the human-powered vehicle A.

Second Embodiment

The transmission system 10 in accordance with the second embodiment will now be described with reference to FIG. 6. Same reference numerals are given to those components that are the same as the corresponding components of the first embodiment. Such components will not be described in detail.

The controller 14 sets the shifting condition in accordance with at least one of the first example and the second example. The storage 16 stores the information related to the shifting condition in advance. In the present embodiment, the controller 14 updates the information related to the shifting condition stored in the storage 16 with the information related to a newly set shifting condition.

Figure 6:
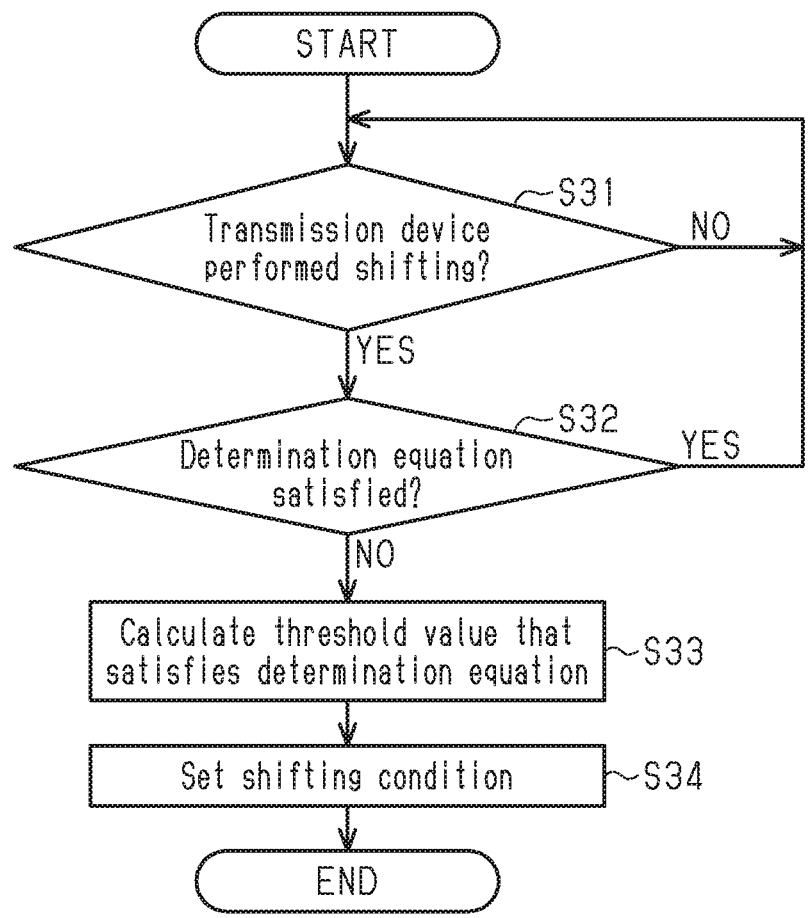
FIG. 6 is a flowchart illustrating one example of a second condition setting control executed by a control device in a transmission system in accordance with a second embodiment.

With reference to FIG. 6, one example of a second condition setting control executed by the control device 12 will now be described. The controller 14 executes the second condition setting control to set the shifting condition, for example, in accordance with at least one of the first example and the second example.

In step S31, the controller 14 determines whether shifting has been performed by the transmission device 20. Upon determining that shifting has not been performed by the transmission device 20 in step S31, the controller 14 repeats step S31. Upon determining that shifting has been performed by the transmission device 20 in step S31, the controller 14 proceeds to step S32.

In step S32, the controller 14 determines whether the determination equation has been satisfied. In one example, the controller 14 determines whether the determination equation (4) has been satisfied in a case where the transmission device 20 had been controlled to increase the transmission ratio GR of the human-powered vehicle A in step S31. In a case where the transmission device 20 has been controlled to decrease the transmission ratio GR of the human-powered vehicle A in step S31, the controller 14 determines whether the determination equation has been satisfied. In step S32, upon determining that the determination equation has been satisfied, the controller 14 returns to step S31. In step S32, upon determining that the determination equation has not been satisfied, the controller 14 proceeds to step S33.

In step S33, the controller 14 calculates the threshold value TH that satisfies the determination equation. In one example, the controller 14 calculates the second threshold value TH2 that satisfies the determination equation (4) or the first threshold value TH1 that satisfies the determination equation (7). In step S34, the controller 14 sets the shifting condition. Specifically, the controller 14 updates the information related to the shifting condition stored in the storage 16 with the threshold values TH1 and TH2 calculated in step S33. This completes the processes of steps S31 to S34. The controller 14 repeats the second condition setting control including steps S31 to S34, for example, as the human-powered vehicle A travels.

Modifications

The description related with the above embodiments exemplifies, without any intention to limit, an applicable form of a control device and a transmission system according to the present disclosure. In addition to the embodiments described above, the control device and the transmission system in accordance with the present disclosure are applicable to, for example, modifications of the above embodiments that are described below and combinations of at least two of the modifications that do not contradict each other. In the modifications described hereafter, same reference numerals are given to those components that are the same as the corresponding components of the above embodiments. Such components will not be described in detail.

The content of the control executed by the controller 14 can be changed to any content. In one example, in a case where the variable U and the variable D used in equations (2) to (7) are the same value, the controller 14 sets the first threshold value TH1 and the second threshold value TH2 based on the reference cadence CS. Specifically, upon determining the absolute value of the difference of the reference cadence CS and the first threshold value TH1 is the same value as the absolute value of the difference of the reference cadence CS and the second threshold value TH2, the controller 14 sets the first threshold value TH1 and the second threshold value TH2 based on the reference cadence CS.

The controller 14, for example, sets the shifting condition in accordance with at least one of a third setting process and a fourth setting process, which will now be described. The third setting process is a process corresponding to the first example and the second example. The third setting process includes thirteenth to fourteenth steps. In the thirteenth step, the controller 14 sets the reference cadence CS. In the fourteenth step, the controller 14 calculates the first threshold value TH1 and the second threshold value TH2 based on the reference cadence CS. In one example, the controller 14 calculates the first threshold values TH1 and TH2 that satisfy following determination equation (8). The determination equation (8) is a determination equation obtained by modifying equations (2) to (4) with the same variable U and variable D used in equations (2) to (4).

Equation 8

$$U(D) > CS(1 - TR_{n+1}/TR_n)/(1 + TR_{n+1}/TR_n) \quad (8)$$

The reference cadence CS is substituted into the variable CS. The number of teeth TR of the rear sprocket D2, around which the chain D3 is wound, is substituted into the variable $TR_n$. The number of teeth TR of the rear sprocket D2, around which the chain D3 is wound, is substituted into the variable $TR_{n+1}$ after the transmission device 20 is shifted to increase the transmission ratio GR of the human-powered vehicle A. In one example, the controller 14 calculates the variable U(D) that satisfies the determination equation (8) and then calculates the first threshold value TH1 (CS+U) and the second threshold value TH2 (CS−D). In this manner, the controller 14 sets the shifting condition in accordance with the third setting process.

The fourth setting process is a process corresponding to the first example and the second example. The fourth setting process includes fifteenth to sixteenth steps. In the fifteenth step, the controller 14 sets the reference cadence CS. In the fifteenth step, the controller 14 calculates the first threshold value TH1 and the second threshold value TH2 based on the reference cadence CS. In one example, the controller 14 calculates the first and second threshold values TH1 and TH2 that satisfy determination equation (9). The determination equation (9) is a determination equation obtained by modifying equations (5) to (7) with the same variable U and variable D used in equations (5) to (7).

Equation 9

$$U(D) > CS(TR_{n-1}/TR_n - 1)/(1 + TR_{n-1}/TR_n) \quad (9)$$

The reference cadence CS is substituted into the variable CS. The number of teeth TR of the rear sprocket D2, around which the chain D3 is wound, is substituted into the variable $TR_n$. The number of teeth TR of the rear sprocket D2, around which the chain D3 is wound, is substituted into the variable $TR_{n-1}$ after the transmission device 20 is shifted to decrease the transmission ratio GR of the human-powered vehicle A. In one example, the controller 14 calculates the variable U(D) that satisfies the determination equation (9) and then calculates the first threshold value TH1 (CS+U) and the second threshold value TH2 (CS−D). In this manner, the controller 14 sets the shifting condition in accordance with the fourth setting process. The controller 14 sets the shifting condition in accordance with at least one of the third setting process and the fourth setting process for at least one of the transmission ratio GR of the human-powered vehicle A and the first reference value RV1.

The second reference value RV2 can be changed to any type of value. In a first modification, the second reference value RV2 includes environment information related to traveling environment of the human-powered vehicle A. The environment information includes at least one of road surface information related to the condition of road surface, air resistance information related to air resistance, weather information related to the weather, and temperature information related to the temperature. In a second modification, the second reference value RV2 includes at least one of the traveling information and the environment information.

The human-powered vehicle A can be of any types. In the first modification, the human-powered vehicle A is a road bike, a mountain bike, a cross bike, a city cycle, a cargo bike, or a recumbent bicycle. In the second modification, the human-powered vehicle A is a kick scooter.

The phrase "at least one of" as used in this disclosure means "one or more" of a desired choice. For one example, the phrase "at least one of" as used in this disclosure means "only one single choice" or "both of two choices" if the number of its choices is two. For another example, the phrase "at least one of" as used in this disclosure means "only one single choice" or "any combination of equal to or more than two choices" if the number of its choices is equal to or more than three.

What is claimed is:

1. A control device comprising:
    an electronic controller configured to automatically control a transmission device of a human-powered vehicle in accordance with a shifting condition, the human-powered vehicle including a first sprocket driven to obtain a first transmission ratio and a second sprocket driven to obtain a second transmission ratio,
    the electronic controller being configured to set the shifting condition based on first reference information including information related to a change in a transmission ratio that is shifted by the transmission device, the transmission ratio including the first and second transmission ratio, the information including a combination of the first transmission ratio and the second transmission ratio, the information further including information related to a difference in a number of teeth of the first sprocket and a number of teeth of the second sprocket, and
    the electronic controller further being configured to set setting a threshold value based on the first reference information, wherein the shifting condition is determined based on the threshold value.

2. The control device according to claim 1, wherein the first sprocket and the second sprocket are included in one of a front sprocket of the human-powered vehicle and a rear sprocket of the human-powered vehicle.

3. A control device according comprising:
    an electronic controller configured to automatically control a transmission device of a human-powered vehicle in accordance with a shifting condition, the human-powered vehicle including a first sprocket driven to obtain a first transmission ratio and a second sprocket driven to obtain a second transmission ratio,
    the electronic controller being configured to set the shifting condition based on first reference information including information related to a combination of the first transmission ratio and the second transmission ratio, the information further including information related to a difference in a number of teeth of the first sprocket and a number of teeth of the second sprocket, and the electronic controller further being configured to set a threshold value based on the first reference information, wherein the shifting condition is determined based on the threshold value.

4. The control device according to claim 1, wherein the information related to the change in the transmission ratio includes information related to a combination of at least one front sprocket of the human-powered vehicle and at least one rear sprocket of the human-powered vehicle.

5. The control device according to claim 4, wherein the information related to the change in the transmission ratio includes at least one of information related to the transmission ratio and information related to a number of teeth of the front sprocket and a number of teeth of the rear sprocket.

6. The control device according to claim 1, wherein the first reference information further includes a first reference value including traveling information related to a traveling state of the human-powered vehicle.

7. A control device comprising:
an electronic controller configured to automatically control a transmission device of a human-powered vehicle in accordance with a shifting condition, the electronic controller being configured to set the shifting condition based on first reference information including information related to a change in a transmission ratio that is shifted by the transmission device, the first reference information further including a first reference value including traveling information related to a traveling state of the human-powered vehicle,
the shifting condition being determined based on a second reference value and a threshold value, and
the electronic controller being further configured to set the threshold value based on the first reference information.

8. The control device according to claim 7, wherein the threshold value includes a first threshold value and a second threshold value,
the electronic controller is configured to control the transmission device so that the transmission ratio increases in accordance with a relationship of the second reference value and the first threshold value, and
the electronic controller is configured to control the transmission device so that the transmission ratio decreases in accordance with a relationship of the second reference value and the second threshold value.

9. The control device according to claim 8, wherein the first threshold value differs from the second threshold value.

10. The control device according to claim 9, wherein the first threshold value differs from the second threshold value by a predetermined value, and
the electronic controller is configured to vary the threshold value in order to change the predetermined value based on the first reference information.

11. The control device according to claim 8, wherein the electronic controller is configured to set one of the first threshold value and the second threshold value in accordance with the other one of the first threshold value and the second threshold value.

12. A control device comprising:
an electronic controller configured to automatically control a transmission device of a human-powered vehicle in accordance with a shifting condition,
a first reference value including traveling information related to a traveling state of the human-powered vehicle, the shifting condition being determined based on a second reference value and a threshold value,
the electronic controller being further configured to set the threshold value based on second reference information including a present transmission ratio of the human-powered vehicle, and a subsequent transmission ratio after shifting.

13. The control device according to claim 12, wherein the second reference information includes a reference value difference of the second reference value that is estimated from a relationship of the present transmission ratio and the first reference value and the second reference value that is estimated from the relationship of the subsequent transmission ratio and the first reference value.

14. The control device according to claim 12, wherein the threshold value includes a first threshold value and a second threshold value, and
the electronic controller is configured to control the transmission device so that the present transmission ratio increases in accordance with a relationship of the second reference value and the first threshold value, and
the electronic controller is configured to control the transmission device so that the present transmission ratio decreases in accordance with a relationship of the second reference value and the second threshold value.

15. The control device according to claim 14, wherein the first threshold value differs from the second threshold value.

16. The control device according to claim 15, wherein the first threshold value differs from the second threshold value by a predetermined value, and
the electronic controller is configured to vary the threshold value in order to change the predetermined value based on the second reference information.

17. The control device according to claim 14, wherein the electronic controller is configured to set one of the first threshold value and the second threshold value in accordance with the other one of the first threshold value and the second threshold value.

18. The control device according to claim 7, wherein the second reference value includes the traveling information that differs from the first reference value.

19. The control device according to claim 6, wherein the electronic controller is configured to set the shifting condition for at least one of the transmission ratio and the first reference value.

20. The control device according to claim 6, wherein the traveling information includes at least one of cadence, torque acting on a crank of the human-powered vehicle, vehicle speed, acceleration, and power.

21. The control device according to claim 1, further comprising
storage that stores the shifting condition in an updatable manner.

22. A shifting system comprising the control device according to claim 1 and further comprising:
the transmission device.

* * * * *